(12) United States Patent
Wild et al.

(10) Patent No.: US 10,437,376 B2
(45) Date of Patent: Oct. 8, 2019

(54) USER INTERFACE AND METHOD FOR ASSISTING A USER IN THE OPERATION OF AN OPERATOR CONTROL UNIT

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE); Gordon Seitz, Ehra-Lessien (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 130 days.

(21) Appl. No.: 15/025,528

(22) PCT Filed: Sep. 27, 2013

(86) PCT No.: PCT/EP2013/070215
§ 371 (c)(1),
(2) Date: Mar. 31, 2016

(87) PCT Pub. No.: WO2015/043653
PCT Pub. Date: Apr. 2, 2015

(65) Prior Publication Data
US 2016/0246436 A1 Aug. 25, 2016

(51) Int. Cl.
*G06F 3/0488* (2013.01)
*G06F 3/041* (2006.01)
(Continued)

(52) U.S. Cl.
CPC ............ *G06F 3/0416* (2013.01); *B60K 37/06* (2013.01); *G06F 3/017* (2013.01); *G06F 3/048* (2013.01);
(Continued)

(58) Field of Classification Search
CPC ........ G06F 3/04883; G06F 3/048; G06F 3/01; G06F 3/011; G06F 3/0416; G06F 3/167;
(Continued)

(56) References Cited

U.S. PATENT DOCUMENTS 8,887,043 B1* 11/2014 Pollack ................. G06F 3/0304
345/108
9,030,418 B2* 5/2015 Ku ......................... G06F 3/0416
345/156
(Continued)

FOREIGN PATENT DOCUMENTS

CN 101539834 A 9/2009
DE 102007039450 A1 2/2009
(Continued)

OTHER PUBLICATIONS

Korean Patent Appln. No. KR-10-2016-7010801. Applicant: Volkswagen AG. Office Action (dated Feb. 13, 2017).
(Continued)

*Primary Examiner* — Dismery Mercedes
(74) *Attorney, Agent, or Firm* — Loza & Loza, LLP; Peter Zura

(57) ABSTRACT

User interfaces and processes to support a user during the operation of a touch-sensitive control unit. A presence of an input means, such as a finger of the user, is detected in a predefined first area in front of a button displayed on the control unit. In response to the detection a timer is started having a predetermined time segment. When the timer elapses, a secondary function in the control unit is executed relative to the button in which the input means is detected.

20 Claims, 3 Drawing Sheets

(51) Int. Cl.
*G06F 3/0484* (2013.01)
*B60K 37/06* (2006.01)
*G06F 3/048* (2013.01)
*G06F 3/16* (2006.01)
*G06F 3/01* (2006.01)

(52) U.S. Cl.
CPC ........ *G06F 3/0488* (2013.01); *G06F 3/04847* (2013.01); *G06F 3/04883* (2013.01); *G06F 3/167* (2013.01); *B60K 2370/11* (2019.05); *B60K 2370/119* (2019.05); *B60K 2370/146* (2019.05); *B60K 2370/1438* (2019.05); *G06F 2203/04101* (2013.01); *G06F 2203/04108* (2013.01)

(58) Field of Classification Search
CPC .. G06F 3/0482; G06F 3/04817; G06F 3/0488; G06F 3/017; G06F 3/41; G06F 9/451; G06F 2203/04108; G06F 2203/04101; G06F 3/04842; G06F 3/0412; G06F 3/04845; G06F 2203/04808; G06F 2203/04104; B60K 2370/11; B60K 2370/113; B60K 2370/115; B60K 2370/119; B60K 2370/122; B60K 2370/1438; B60K 2370/1468; B60K 2370/146; B60K 35/00
See application file for complete search history.

(56) References Cited

U.S. PATENT DOCUMENTS

| | | | | |
|---|---|---|---|---|
| 9,189,142 | B2* | 11/2015 | Kim | G06F 3/044 |
| 9,662,980 | B2* | 5/2017 | Izumi | B60K 35/00 |
| 9,904,405 | B2 | 2/2018 | Kim et al. | |
| 2006/0022955 | A1* | 2/2006 | Kennedy | G06F 3/0414 |
| | | | | 345/173 |
| 2009/0225043 | A1* | 9/2009 | Rosener | G06F 3/016 |
| | | | | 345/173 |
| 2009/0237372 | A1* | 9/2009 | Kim | G06F 3/044 |
| | | | | 345/173 |
| 2010/0093400 | A1* | 4/2010 | Ju | G06F 3/04817 |
| | | | | 455/566 |
| 2010/0250071 | A1* | 9/2010 | Pala | B60K 35/00 |
| | | | | 701/48 |
| 2010/0283754 | A1* | 11/2010 | Nakao | G06F 3/04847 |
| | | | | 345/173 |
| 2011/0022393 | A1* | 1/2011 | Waller | G01C 21/3608 |
| | | | | 704/270 |
| 2012/0105349 | A1* | 5/2012 | Hauschild | B60K 35/00 |
| | | | | 345/173 |
| 2012/0268404 | A1* | 10/2012 | Kuhn | B60K 35/00 |
| | | | | 345/173 |
| 2013/0050131 | A1* | 2/2013 | Lee | G08G 1/09626 |
| | | | | 345/174 |
| 2013/0144463 | A1* | 6/2013 | Ricci | G06F 9/54 |
| | | | | 701/1 |
| 2013/0293364 | A1* | 11/2013 | Ricci | B60K 35/00 |
| | | | | 340/425.5 |
| 2014/0189597 | A1* | 7/2014 | Kang | G06F 3/04817 |
| | | | | 715/835 |
| 2014/0210739 | A1* | 7/2014 | Aono | G06F 3/044 |
| | | | | 345/173 |
| 2014/0347326 | A1* | 11/2014 | Yim | H04M 1/2477 |
| | | | | 345/179 |
| 2015/0309573 | A1* | 10/2015 | Brombach | B60K 37/02 |
| | | | | 715/702 |
| 2017/0060315 | A1* | 3/2017 | Park | G06F 3/0482 |

FOREIGN PATENT DOCUMENTS

KR 20120067334 6/2012
WO 20009/062677 A2 5/2009

OTHER PUBLICATIONS

International Search Report and Written Opinion for PCT/EP13/70215 dated May 16, 2014; 12 pages.
CN Patent Appln. No. 201380080480.0. Applicant: Volkswagen Aktiengesellschaft. Office Action (dated Feb. 9, 2018).

* cited by examiner

USER INTERFACE AND METHOD FOR ASSISTING A USER IN THE OPERATION OF AN OPERATOR CONTROL UNIT

RELATED APPLICATIONS

The present application claims priority to International Patent Application No. PCT/EP2013/70215, titled "User Interface and Method for Assisting a User in the Operation of an Operator Control Unit" to Wild et al., filed Mar. 27, 2013, the contents of which is incorporated by reference in its entirety herein.

BACKGROUND

The present disclosure relates to a user interface and a process to support a user during the movement of a touch-sensitive control unit. More specifically, the present disclosure relates to supporting a driver of a transportation means during operation of a transportation means-based control unit while driving the transportation means.

Operating systems for control units are known from the prior art, which utilize display screen contents, in which information units/switch units (also referred to as "icons" or "tiles") are arranged side by side for starting an assigned function. In response to a request by a user, these tiles can occasionally be rearranged to one another or be completely exchanged. Occasionally it is also possible to change the presentation of the tiles or modify information within the tiles. Examples for generic operating systems are Windows 8™ and AirView™ of the Samsung Galaxy S4™. For the operation of control units of transportation means and smartphones, however, apart from keyboard-based input units, so-called "touchscreen" (touch-sensitive display screen) have also been successful.

WO 2009/062677 A2 discloses a multimodal user interface of a driver information system for input and presentation of information, in which the presence of a finger of a user in an area in front of a pre-defined screen area results in triggering a function of the user interface. Here, the presence of the finger is detected and sometimes is even assigned to an actual display screen content without the user being in contact with the control unit, so that a context specific function is started as a result of this control step, also designated as "hovering."

The control steps described in the prior art, however, do not take advantage of the potential for such operating control units.

For this reason, there is a need in the art to provide additional possibilities for a user to interact with a control unit.

BRIEF SUMMARY

According to various illustrative embodiments, processes to support a user during the operation of a touch-sensitive control unit are disclosed, comprising the steps of detecting a presence of an input means, such as a finger of the user, in a predefined first area in front of a button displayed on the control unit, where, in response thereupon, a timer may be started with a predefined time segment, and in response to an elapse of the timer, executing a secondary function of the button associated with the button. In certain illustrative embodiments, the timer may be stopped as soon as the presence of the input means ends in the predefined first area. A primary function may be executed if the presence of the input means ends in a predefined first time range of the timer, and the secondary function is executed, if the presence of the input means ends in a predefined second time range of the timer, wherein the first time range is shorter than the second time range.

In certain illustrative embodiments, detecting the presence may include a detection of a crossover of the input means from a predefined second area into the predefined first area relative to the control unit. The elapse of the timer may initiate an audio output, and/or the button may be designated as an element of a main display screen. An illustrative secondary function may include an output of a latest navigation announcement, a start of a context specific voice dialog, reading out a text message, a command for an input of a new navigation destination, a command for input of a piece of music to be played, a change of a content of the button, a beginning of a process for shifting the content of the button (10, 20, 30) to another position, in particular onto a further display unit, and/or a command for adapting a size of display of the content of the button. In certain illustrative embodiments, the secondary function to a button may be assigned by a user.

In certain illustrative embodiments, a user interface is disclosed, such as a human-machine interface permanently installed in a motor vehicle, comprising: a touch-sensitive control unit, a detection device for detecting a user input, and a processing device, wherein the user interface is configured to execute a function relating to the vehicle. The control unit may be positioned centrally in the instrument panel of a motor vehicle, and/or the detection device may include a camera system and/or a capacitive sensor.

BRIEF DESCRIPTION OF THE DRAWINGS

Embodiments of the invention are described in detail below with reference to the accompanying drawings, in which.

DETAILED DESCRIPTION

Figure 1:
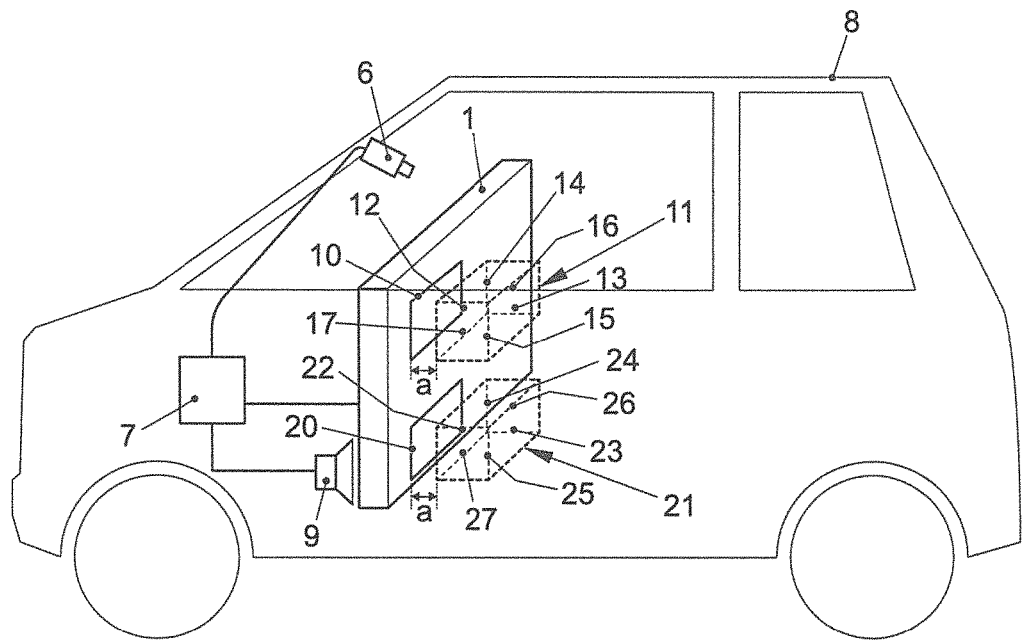
FIG. 1 is a schematic overview showing components of a user interface according to an illustrative embodiment.

Various illustrative embodiments are disclosed for systems, apparatuses and methods to support a user during the operation of a touch-sensitive control unit and comprises detection of a presence of an input means in a predefined first area in front of a button displayed on the control unit. In this context, the control unit can be a touch-sensitive screen of a "smartphone," or a "tablet", or of an HMI inside of a motor vehicle, for example. The input means can be a "stylus," a writing instrument or preferably the finger of a user, for example. The term "in front of a button displayed on the control unit" as used herein refers an area that is not in physical contact with the control unit, and is sometimes referred to as "hovering." In response to the detected presence, a timer with a pre-defined time segment is started. In response to an elapse of the timer, a secondary function associated with the function of the button is executed.

In certain illustrative embodiments, reference to a "secondary function of the button" designates a function that does not involve an execution of the associated function itself, but rather describes alternative interaction with regard to the button or the primary function, reorganizing or modifying the button or the function. In mouse-based operation of PC operating systems, such secondary functions are frequently initiated by right-clicking. Examples of secondary functions are explained in the disclosure below.

In certain illustrative embodiments, reference to a "button" may be understood as an element, which not merely serves for starting a main function ("primary function"), but also a two-dimensional limited element for reproduction of information (e.g. reproduced title, navigation route, weather), which are also known as "tiles". The button may be accessible to an interaction at least insofar as a user input relating to the button is detected and can be assigned to the button. Accordingly, a secondary function can be initiated after a predefined retention time of the input means in front of the button. Additional functions associated with the button may also be made accessible, although right-clicking is not available, for example, due to the absence of a corresponding input means.

A timer can be controlled or stopped, as soon as the presence of the input means in the predefined first area ends before the timer elapses. In such a configuration, inadvertent triggering of functions may be avoided, when a transient presence of the input means is detected in front of a button of the control unit. In certain illustrative embodiments, primary functions can be executed if the presence of the input means ends in a predefined first time range (e.g. prior to the elapse) of the timer. In other words, a primary function assigned to the button can be accessed directly, as soon as the presence of the input means exists for a minimum time. Alternatively, the primary function can be executed, if the presence of the input means continues for at least a second (shorter) time range, but ends prior to the elapse of the first time range. In this way, it is possible to differentiate between the primary function and the secondary function or a respective corresponding input, which increases the variety of possible interactions and reduces the number of necessary interactions for triggering a secondary function (according to the prior art, e.g. via a configuration menu).

The predefined first area can be arranged in a distance range between 1 mm and 100 mm from the surface of the control unit. A minimum distance >0 mm, preferably 1 mm, most preferably >2 mm from the surface should be maintained to permit a clear distinction between the touch inputs and the hover inputs. The extension of the predefined first area parallel to the surface of the control unit can essentially be limited according to the button itself. In this way, such a boundary surface results for the first predefined area vertically to the surface of the control unit, so that the button presents a vertical projection of the first predefined area onto the surface. In this way, the buttons arranged next to one another can be assigned to an input according to the present disclosure and the corresponding secondary functions can be reliably differentiated.

In certain illustrative embodiments, it may not be required that, prior to the presence of the input means, no interaction occurred with the control unit within the first predefined area. For this reason, a presence can also be detected, if the input means of a predefined second area exceeds the predefined first area relative to the control unit. Starting the timer may not be dependent upon whether exiting the second area or entering the first area is detected. Likewise, a presence in a first area between the first and the second area may be configured to cause the timer to be started. In this way, the secondary function can be initiated irrespective of the origin of the input means, which increases the user acceptance of such a control step.

Preferably, the elapse of the timer can initiate an audio output, by means of which the user is notified that a secondary function is being executed or can at least be selected. In particular, in the case that the user executes the control step during the perception of his driving task, the user can remain to be focused on the road traffic, while he or she is notified by the audio output about the pending or executed secondary function. Furthermore, the user may be notified that the control step executed did not initiate the primary function. Therefore, the audio output facilitates further improvement of the process disclosed herein.

The button may be an element of a main display screen, which may be referred to as an initial screen or "home screen." In such home screens, a secondary function may include alternatively configuring or deleting associated graphical screen elements ("icons") with predefined functions. In this way it is possible to use a control step according to the present disclosure ("longpress—hovering") for user specific configuration or layout of a home screen.

In certain illustrative embodiments, secondary functions, which can be associated during the interaction with a map display of a navigation system, may be configured as an output of a latest navigation announcement or the start of a context-specific voice dialog, by means of which the user can input a new destination, retrieve the distance or time until reaching the destination or the current traffic obstructions on a current route. A text message received or generated can be read out in a specific context. If the button is assigned to an entertainment function, the input according to one embodiment may include a command for controlling the reproduction of music. The current playback can be stopped or continued for example, or a voice dialogue can be input to start a specific piece of music to be played.

Alternately and/or independently of an associated primary function, the input according to an example can also include changing the content of the button. For example, depending on the input, the user can select which information the button is to reproduce subsequently. A further secondary function may include shifting the button or its content to another position within the display of the control unit. When using two display screens (e.g. a smartphone and a television or an HMI display and an instrument cluster), it would be possible, for example, to shift the information content of the button being controlled onto another display screen. Alternatively, the secondary function can also facilitate adapting the size of the display of the button content. Accordingly, the above-mentioned secondary functions can be started by a single process step, without first having to call up a secondary menu.

In one example, the secondary functions assigned to an interaction can be edited by a configuration menu, for example. In that case, a pre-defined secondary function can likewise be assigned to a button as well as multiple secondary functions, from which one is selected as desired after a process step. In this context, the plurality of associated secondary functions can be visualized and selected in form of a secondary menu (e.g. in form of a so-called "pop-up"), for example.

In certain illustrative embodiments, a user interface is disclosed, which may be installed in a motor vehicle as a permanently installed human-machine interface (HMI). One skilled in the art will appreciate that the present disclosure is equally applicable to user interfaces of hand-held user terminals (e.g. smartphones, tablets). In one example, the user interface comprises a touch-sensitive control unit and a detection device for detecting a user input. The processing unit is provided for assigning user inputs to the buttons represented on the control unit, which can include a processor (e.g. microcontroller, nano controller, or similar), for example. The detection device may include a camera and/or a capacitive sensor, by means of which longpress hover inputs can be detected according to the present disclosure.

In certain illustrative embodiments, a user input may be used for starting a timer, upon the elapsing of which a secondary function is executed, and may be assigned on a graphic button represented on the control unit. The control unit may be positioned centrally in the instrument panel of a vehicle, for example, and can optionally comprise a pixel-based display (also "matrix display"), which is located in the instrument cluster of the motor vehicle. In one example, an indicating instrument can be (solely) located in the instrument cluster designed as control unit in terms of the present invention, as well. This offers the particular advantage that a user can make inputs without having to reach between the spokes of the steering wheel.

To render the present technology tolerant against short-term exiting of a predefined area in front of a button, a second timer can be used, by means of which a time segment between exiting and re-entering the input means is detected with reference to the same area. If the second timer drops below a predefined time segment until re-entry, the first timer according to the invention continues, instead of having to be restarted. Particularly in difficult input situations, this will enable the more reliable triggering of a secondary function, which renders initiating the secondary function according to the invention more user-friendly especially on bumpy roads, for example.

FIG. 1 shows a transportation means 8 in which a monitor of an HMI is inserted as control unit 1 into the instrument panel. In the area of the windscreen, a camera 6 may be provided as detection device. The camera 6 is connected by means of data technology with an electronic control unit 7 as processing unit. Furthermore, the electronic control unit 7 is connected with a loudspeaker 9 for production of an audio output as well as with the control unit 1, on the monitor off which a first button 10 and a second button 20 are represented. In a respective distance a to the buttons 10, 20, respective rectangular areas 11, 21, are represented with dotted lines, in which a presence of an input means can be detected as hovering. The areas 11, 21 are bordered by a first surface 12 or 22 oriented parallel to the surface area of the control unit 1, a second surface 13 or 23 oriented parallel to the surface area of the control unit 1 and a surface area spaced further apart from the surface area, and by four surfaces 14 or 24, 15 or 25, 16 or 26 and 17 or 27 oriented perpendicular to the surface area of the control unit 1, such that the buttons 10, 20 represent vertical projections of the areas 11, 21 on the surface area of the control unit 1 or bordered by the edges of these projections.

Figure 2:
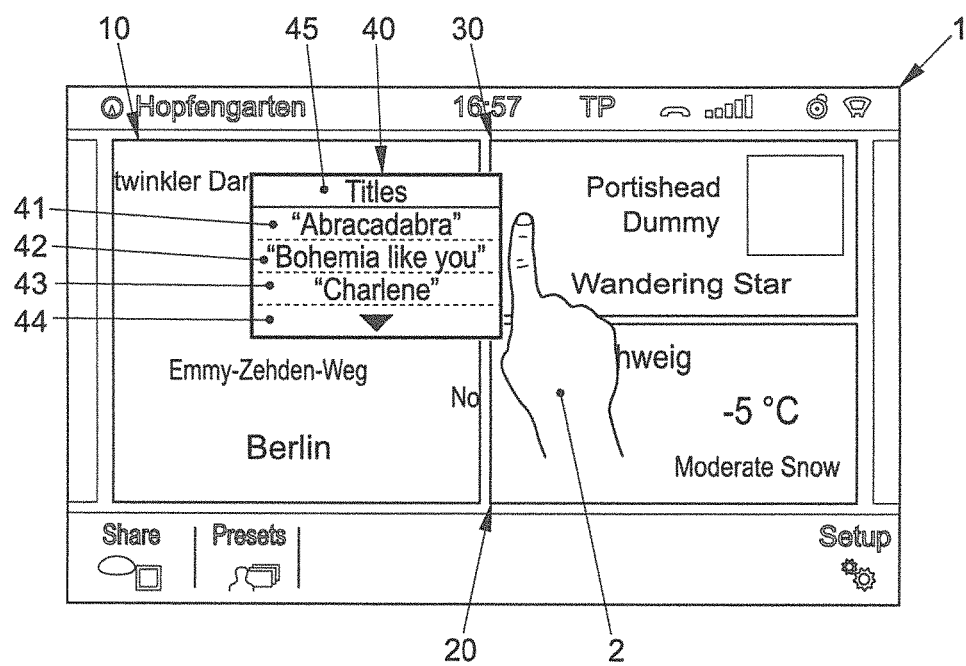
FIG. 2 is a schematic view of an operational process according to an illustrative embodiment.

FIG. 2 shows a control unit 1 of a user interface according to an illustrative embodiment. On a left side, a map section is illustrated in a first button 10, which map section corresponds with a part of a route calculated by a navigation system. In an upper area on the right side of the screen, a third button 30 is displayed, by means of which a title currently being played, the artist, and the album in which the title is contained is optically presented. Below the third button 30, a second button 20 is represented, in which the weather in the city of Braunschweig is presented in form of an icon together with the temperature in degrees centigrade and the current precipitation. The hand of a user 2 is in front of the third button 30. After a pre-defined time segment, which can be determined via a timing sequence, a secondary function associated with the third button 30 is started. This consists in that a pop-up 40 of the previous presentation is superimposed, in which three music titles 41, 42, 43 below the title 45 are offered for playing. The user 2 can scroll through the available music titles 41, 42, 43 by means of a button 44 provided with an arrow and by tapping (e.g. in form of a touch input) on a music title 41, 42, 43, without first having to change to a button, which is provided for operating the music playback in form of a primary function.

Figure 3:
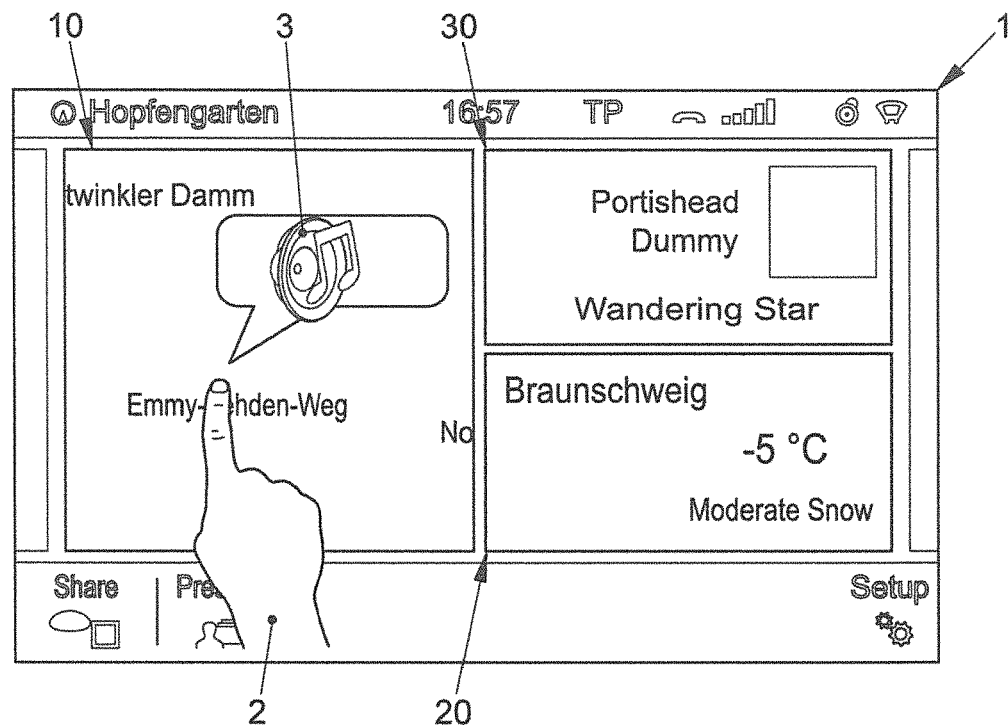
FIG. 3 is an alternative view of an embodiment of an operational process according to an illustrative embodiment.

FIG. 3 shows a user surface in which the user 2 places a finger in front of the first button 10, in order to initiate a secondary function associated with this button. After elapse of a timer, a voice output 3 of a voice dialog function therefore occurs, which serves for operating the navigation system. In the example, the user 2 is requested to input a new destination address. In that the input according to the invention starts a context specific voice-recognition with reference to navigation function, the subsequent inputs or voice commands of the user 2 can be evaluated with respect to a navigation instruction in terms of focus, as a result of which erroneous detection can be reduced.

Figure 4:
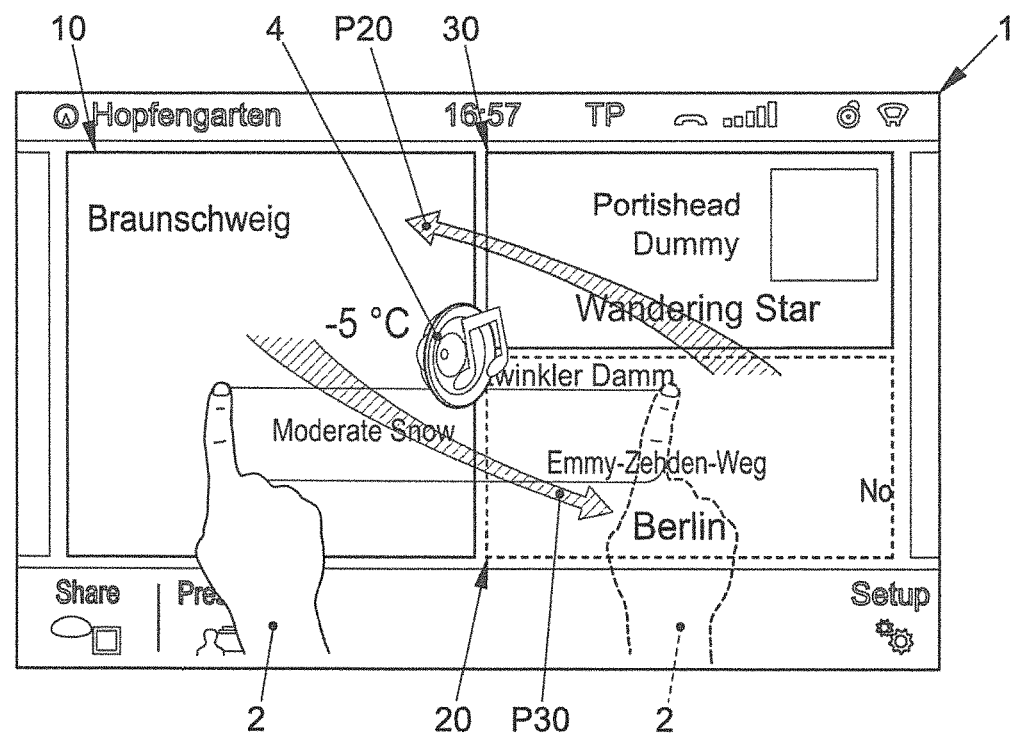
FIG. 4 is a further alternative view of an embodiment of an operational process according to an illustrative embodiment.

FIG. 4 shows the view presented in connection with FIG. 3, in which an alternative gesture P 20 is executed by means of the hand of the user 2. After the hand of the user 2 remains above the second button 20, a new audio output 4 signals that the "drag-and-drop" gesture can produce a rearrangement of the buttons 10, 20, 30. Accordingly, the user 2 shifts the contents of the previous second button 20 along an arrow P20 to the location of the previous first button 10. During the gesture P20, the content of the previous first button 10 automatically jumps to the location of the previous second button 20 (along the arrow P30). In this way, the user 2 can present detailed weather information on a larger area of the screen of the control unit 1, while the route information of the navigation system now requires less space.

Figure 5:
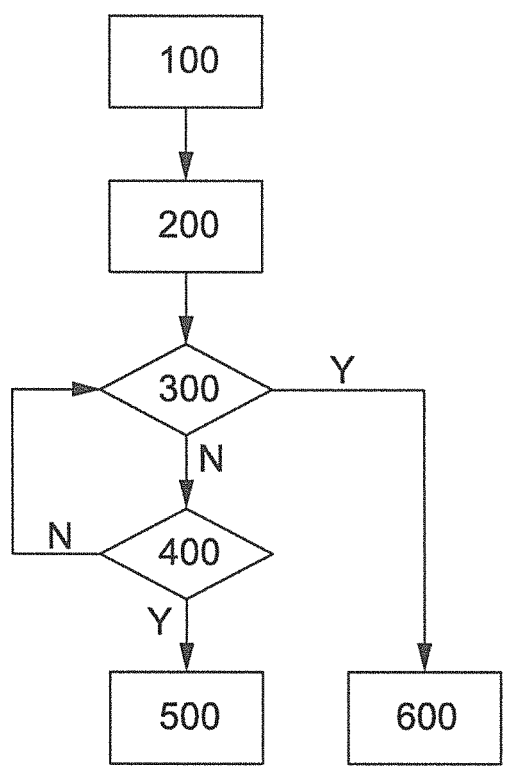
FIG. 5 is a flow diagram illustrating process steps of a process according to an illustrative embodiment.

FIG. 5 shows a flow diagram, illustrating operation processes under an illustrative embodiment. In step 100, the user invokes a configuration menu in the settings of the control unit 1, in which he or she can assign the individual buttons of the operating system to individual or multiple secondary functions. Subsequently, the user completes the configuration and starts operating the user interface. In this context, the presence of a finger in front of a button is detected in step 200, which is displayed on the control unit 1. As soon as the presence of the finger is detected, a timer is started, which thereupon checks in step 300 whether it has elapsed. If this is not the case ("N"), step 400 checks whether the presence of the input means in the predefined area in front of the button has meanwhile been completed. If this is the case ("Y"), a primary function assigned to the button is executed in step 500. This can be the starting of the standard function associated with the button, for example. If the presence of the input means is not completed ("N"), step 300 checks again whether the timer has meanwhile elapsed. If this has meanwhile been the case ("Y"), a secondary function associated with the button is initiated in step 600 according to the invention.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

LIST OF REFERENCE NUMERALS 1 operator control unit
2 user
2, 3 audio output
6 camera
7 electronic control unit
8 vehicle
9 loudspeaker
10 button
11 first area
12, 13, 14, 15, 16, 17 area boundaries
20 button
21 second area
22, 23, 24, 25, 26, 27 area boundaries
40 pop-up
41, 42, 43 music title
44 scrolling surface
45 title bar
100, 200, 300, 400, 500, 600 process steps
a distance
P20 gesture
P30 button movement

The invention claimed is:

1. A method of operating a touch-sensitive operator control unit, comprising:
   displaying a graphical symbol on the operator control unit, configured to execute a primary function associated with the graphical symbol;
   detecting a presence of input means in a predefined first area in front of the operator control unit in an area of the displayed graphical symbol, wherein the predefined first area comprises an area parallel above a surface of the operator control unit;
   executing a timer comprising a predetermined time segment in response to the detected presence of the input means;
   executing the primary function to activate a function associated with the operator control unit if the presence of the input means is detected during a first portion of the predetermined time segment; and
   executing a secondary function associated with the graphical symbol on the operating unit if the presence of the input means is still detected after a second portion of the predetermined time segment has expired, wherein the secondary function activates another function associated with the operator control unit.

2. The method of claim 1, further comprising stopping the timer after the presence of the input means in the predetermined first area is no longer detected.

3. The method of claim 1, further comprising:
   executing the primary function if the presence of the input means in the predetermined first area is no longer detected after the first portion of the predetermined time segment has expired, and
   wherein the secondary function is executed if the presence of the input means in the predetermined first area is no longer detected after the second portion of the predetermined time segment has expired, wherein the second portion is shorter than the first portion.

4. The method of claim 1, wherein the predefined first area comprises a distance of 1 mm to +100 mm from the surface of the control unit.

5. The method of claim 1, wherein an extension direction of the surface area is bounded by an area of the displayed graphical symbol.

6. The method of claim 1, wherein detecting the presence of input means in a predefined first area comprises detecting a crossover of the input means from a predefined second area in front of the operator control unit into the predefined first area.

7. The method of claim 1, further comprising generating an audio output after the predetermined time segment has expired.

8. The method of claim 1, the graphical symbol on the operator control unit comprises an element of a main display screen.

9. The method of claim 1, wherein the secondary function comprises at least one of:
   an output of a navigation announcement;
   a start of a context specific voice dialog;
   an audio rendering of a text message;
   a command for an input of a new navigation destination;
   a command for executing music to be played;
   a change of a content of the graphical symbol;
   a start instruction for shifting the content of the button to another position of the operator control unit; and
   a command for adapting a size of display of the content of the graphical symbol.

10. The method of claim 1, wherein the secondary function associated with the graphical symbol is assigned by a user.

11. A Human Machine Interface installed in a motor vehicle, comprising:
   a touch-sensitive operator control unit configured to display a graphical symbol associated with a primary function on the operator control unit;
   a detection device configured to detect a presence of input means in a predefined first area in front of the operator control unit in an area of the displayed graphical symbol, wherein the predefined first area comprises an area parallel above a surface of the operator control unit; and
   a processing device, operatively coupled to the detection device and the operator control unit, wherein the processing device is configured to execute a timer comprising a predetermined time segment in response to the detected presence of the input means, execute the primary function to activate a function associated with the operator control unit if the presence of the input means is detected during a first portion of the predetermined time segment, and execute a secondary function associated with the graphical symbol on the operating unit if the presence of the input means is still detected after a portion of the predetermined time segment has expired.

12. The Human Machine Interface of claim 11, wherein the processing device is configured to stop the timer after the presence of the input means in the predetermined first area is no longer detected.

13. The Human Machine Interface of claim 11, wherein the processing device is configured to execute the primary function if the presence of the input means in the predetermined first area is no longer detected after the first portion of the predetermined time segment has expired, and wherein the processing device is configured to execute the secondary function if the presence of the input means in the predetermined first area is no longer detected after the second portion of the predetermined time segment has expired, wherein the second portion is shorter than the first portion.

14. The Human Machine Interface of claim 11, wherein the predefined first area comprises a distance of 1 mm to +100 mm from the surface of the control unit.

15. The Human Machine Interface of claim 11, wherein an extension direction of the predefined first area from the surface area is bounded by an area of the displayed graphical symbol.

16. The Human Machine Interface of claim 11, wherein the detection device is configured to detect the presence of input means in a predefined first area comprises detecting a crossover of the input means from a predefined second area in front of the operator control unit into the predefined first area.

17. The Human Machine Interface of claim 11, wherein the processing device is configured to generate an audio output after the predetermined time segment has expired.

18. The Human Machine Interface of claim 11, further comprising a main display screen, wherein the graphical symbol on the operator control unit comprises an element of the main display screen.

19. The Human Machine Interface of claim 11, wherein the secondary function comprises at least one of:
    an output of a navigation announcement;
    a start of a context specific voice dialog;
    an audio rendering of a text message;
    a command for an input of a new navigation destination;
    a command for executing music to be played;
    a change of a content of the graphical symbol;
    a start instruction for shifting the content of the button to another position of the operator control unit; and
    a command for adapting a size of display of the content of the graphical symbol.

20. The Human Machine Interface of claim 11, wherein the secondary function associated with the graphical symbol is assigned by a user via the processing device.

* * * * *